May 31, 1932.  W. H. EMOND  1,860,612
ADJUSTABLE SEAT
Filed Jan. 15, 1929  2 Sheets-Sheet 1
Fig.1.
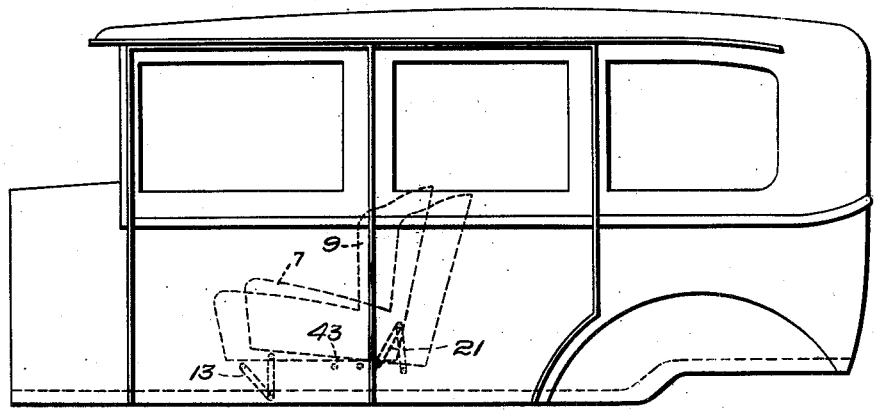
Fig.2.
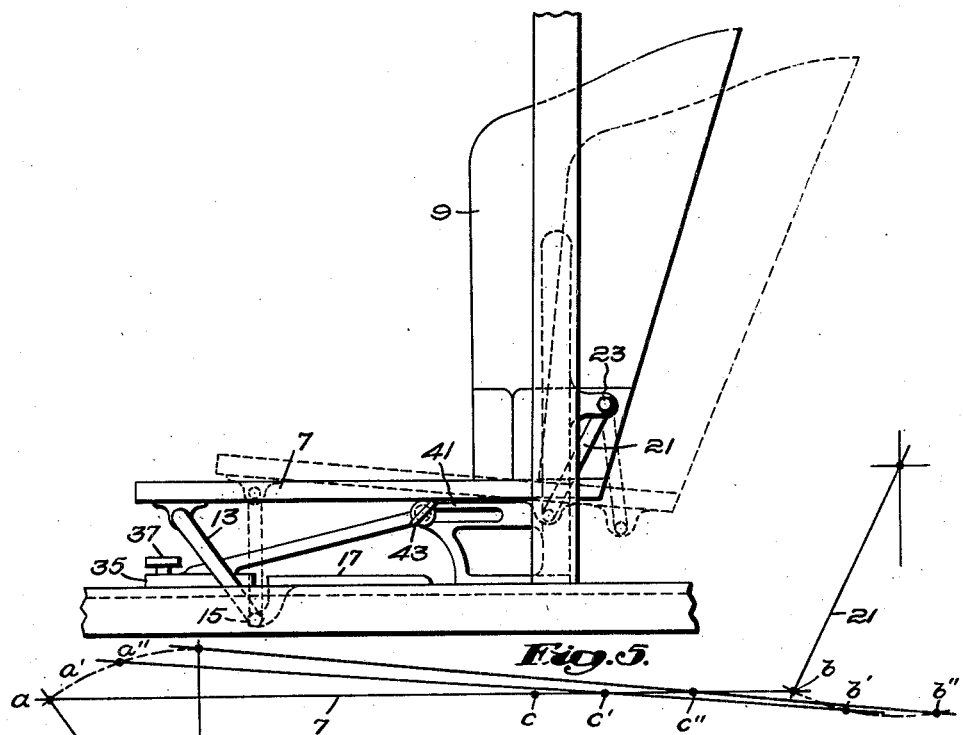
Fig.3.
Inventor:
William H. Emond,
By Emery, Booth, Janney & Varney
Attys.

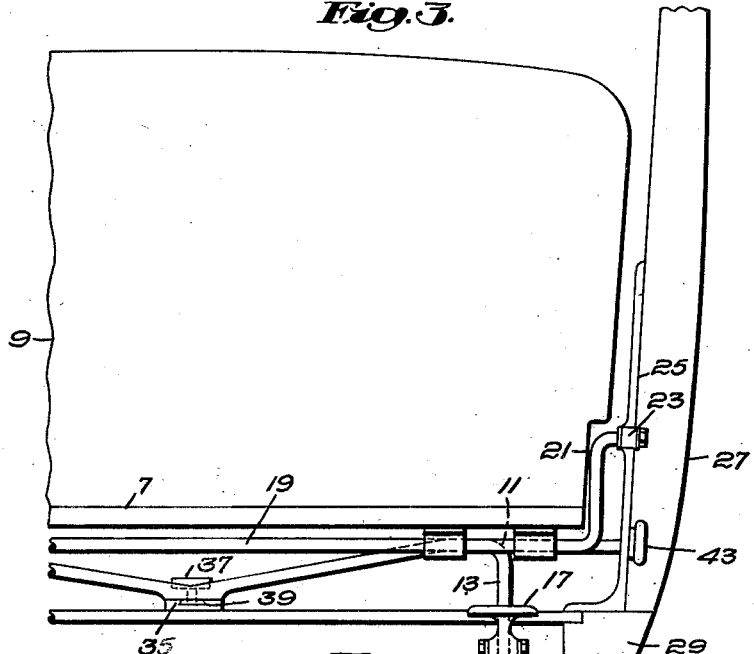
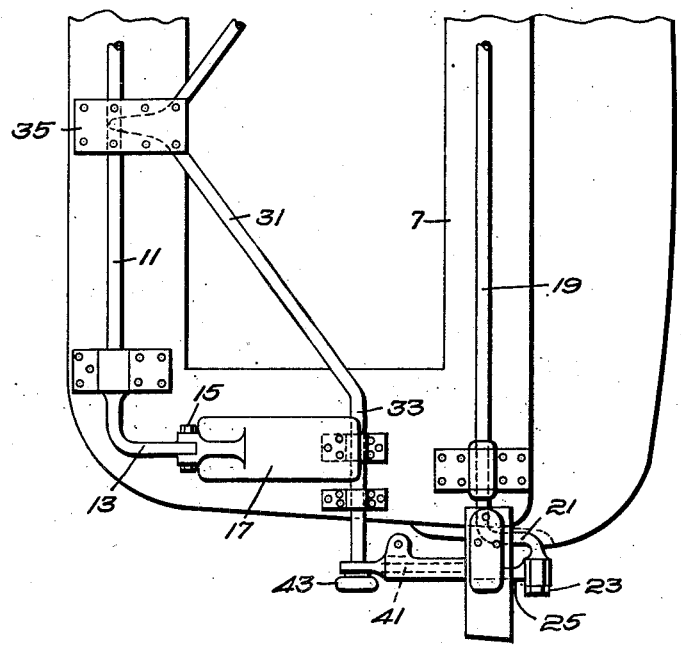

Patented May 31, 1932

1,860,612

UNITED STATES PATENT OFFICE

WILLIAM H. EMOND, OF SYRACUSE, NEW YORK, ASSIGNOR TO H. H. FRANKLIN MANUFACTURING COMPANY, OF SYRACUSE, NEW YORK, A CORPORATION OF NEW YORK

ADJUSTABLE SEAT

Application filed January 15, 1929. Serial No. 332,715.

This invention relates to adjustable seats and the object is to provide an efficient construction for such a seat suitable for automobile use and particularly for the driver's seat and having particular advantages which will appear as the following description proceeds.

My invention will be well understood by reference to the following description of an illustrative embodiment thereof showing its application to a seat of an automotive vehicle of the interior drive type. The specific illustration is of a construction wherein the driver and forward seat passenger are carried on one long seat movable as a whole, but is not necessarily restricted to such an application.

In the annexed drawings:—

Fig. 1 is a side elevation of an automobile body illustrating in dotted lines certain portions of a seat embodying my invention in two positions;

Fig. 2 is a side elevation of the seat as it would appear with the panelling of the body removed;

Fig. 3 is a rear view of a portion thereof;

Fig. 4 is a bottom plan of the seat and its supporting mechanism detached from the floor and framework of the car; and Fig. 5 is a geometrical diagram.

In accordance with my invention in a preferred form, as illustrated herein, I arrange not only for a smoothly working seat adjustable in a fore and aft direction, but for an angular displacement of the seat effected concomitantly with the fore and aft adjustment providing for the driver a posture of maximum comfort with minimum movement of the seat in the fore and aft direction. In the drawings I have shown a seat proper 7, provided with the usual back 9, swingingly supported to move fore and aft in the body and adapted to tilt to raise the forward edge of the seat as it is moved backwardly, as illustrated by the full and dotted lines in Fig. 2. The back 9 moves as a rigid unit with the seat 7 when the latter is moved fore and aft by the means presently to be described.

The movement described may conveniently be effected by swingingly supporting the seat proper on suitable links and herein the forward edge of the seat has pivoted thereto (see Fig. 4) the cross-bar 11 of a U-shaped yoke, the arms 13 of which extend downwardly and are pivoted at 15 in suitable supports 17, herein shown as plates secured to the floor of the vehicle and having brackets to which the arms 13 are pivoted depending beneath the floor to provide a suitable length for the arms. The arms 13 constitute links supporting the front edge of the seat and are arranged to swing rearwardly toward the vertical in the backward adjusting movement of the seat toward the dotted line position in Fig. 2 and in this movement it will be seen that they raise the forward edge of the seat.

The rear side of the seat may have pivoted thereto the cross-bar 19 of a similar yoke, the arms 21 of which are pivoted at 23 to suitable supports which, in the embodiment of the invention illustrated wherein the seat is a unitary one extending across the width of the vehicle, may take the form (see Fig. 3) of brackets 25 secured to the inner faces of the center pillars 27 of the body frame and to the sills 29. The links 21 provided by the arms of the yoke are arranged to swing rearwardly toward the vertical position in the backward movement of the body and thus tend to lower the rear edge of the seat 7 so that as the seat is moved backwardly and forwardly with the links swinging about their pivots it is tilted more or less as indicated for one adjusted position by dotted lines in Fig. 2.

An understanding of the mechanical motion will be facilitated by reference to the diagram of Fig. 5 in which $a$, $a'$ and $a''$ represent different positions of the upper end of the links 13 and $b$, $b'$ and $b''$ corresponding positions of the lower end of links 21. The points $c$, $c'$ and $c''$ correspond to the point of support or sitting position of the driver on the seat 7. This position moves substantially in a straight line. The lengths and disposition of the links may be so taken that this line will be substantially horizontal so as not substantially to reduce the head room on rearward movement of the seat, the invention providing for the comfort of a person of larger stature for whom the seat is rearwardly adjusted independently of vertical movement of the sitting position, as will appear.

In the extreme forward position of a seat operated by the mechanism described, not only is the seat moved forwardly to the proper distance from the foot pedals to permit their convenient operation by a short person, but the front of the cushion is lowered and the back tilted forwardly, thus adding to the driver's comfort and convenience. When the seat is moved backward the front of the cushion is raised as the thigh of the taller person is inclined to rise and the back tilts to a greater angle, thus throwing back the shoulders of the taller driver with his longer arms. In the extreme rear position a very tall person is not only comfortable but the extra inclination of the torso nearly or quite preserves the normal head room.

Suitable means are provided for securing the seat in adjusted position and as an example I have herein shown (see Fig. 3) a Y-shaped member 31 having laterally directed arms 33 pivoted to the bottom of the seat at a point which moves substantially in a straight line in the adjusting movement thereof. The central branch of the Y may be clamped in position to a suitable fixed support such as the gibbed guideway 35 secured to the floor of the vehicle, herein by means of the hand-wheel 37 cooperating with the sliding dovetailed block 39. The ends of the arms 33 may be extended laterally of the seat and slide in slots 41 formed substantially horizontally in extensions of the brackets 25 and provided outwardly of these extensions with heads 43 and thus serving to hold the seat against transverse movement or side sway. As the construction of automobile bodies varies, particularly at or under the front seat, these attachments for securing the seat at different positions may be varied in design to suit the particular body construction to which they are to be applied.

While I prefer to utilize simple links on account of their security and their provision of an easy working adjustment without perceptible friction, obviously equivalent mechanisms enforcing the proper movement of the front or rear of the seat can be utilized in either or both positions without departing from the invention in its broader aspects.

I am aware that the invention may be embodied in other specific forms without departing from the spirit or essential attributes thereof, and I therefore desire the present embodiment to be considered in all respects as illustrative and not restricted; reference being had to the appended claims rather than to the foregoing description to indicate the scope of the invention.

Claims:

1. An adjustable seat for automobiles comprising a seat proper having a back moving as a rigid unit therewith in its movement by the means hereinafter defined, upstanding pivoted links for supporting the forward portion thereof, depending pivoted links for supporting the rear portion thereof, and means for securing the seat in adjusted position.

2. An adjustable seat for automobiles comprising a seat proper having a back moving as a rigid unit therewith in its movement by the means hereinafter defined supporting structures at either side thereof, means swingingly suspending the rear of the seat from said structures, means on the seat having sliding engagement with said structures to hold the seat from transverse movement, means for supporting the front end of the seat permitting fore and aft swinging movement thereof, and means for holding the seat in adjusted position.

3. An adjustable seat for automobiles comprising a seat proper having a back moving as a rigid unit therewith in its movement by the means hereinafter defined supporting structures at either side thereof, means swingingly suspending the rear of the seat from said structures, means for supporting the front end of the seat permitting fore and aft swinging movement thereof, means for holding the seat in adjusted position comprising a brace having arms pivoted to the seat, said arms having ends slidingly engaging said structures to hold the seat against transverse movement, and means for securing the brace to an adjacent fixed structure.

4. An adjustable seat for automobiles comprising a seat proper having a back moving as a rigid unit therewith in its movement by the means hereinafter defined, supporting means for the front and rear thereof respectively, the former adapted to raise the front of the seat and the latter to lower the rear thereof on its bodily movement backwardly, a brace pivoted to the under side of the seat, and means for adjustably clamping the end of the brace for holding the seat in its position.

5. An adjustable seat for automobiles comprising a seat proper having a back moving as a rigid unit therewith in its movement by the means hereinafter defined, supporting means for the front and rear thereof respectively, the former adapted to raise the front of the seat and the latter to lower the rear thereof on its bodily movement backwardly, a brace having a transverse arm pivoted to the under side of the seat, means for adjustably clamping the end of the brace to hold the seat against fore and aft movement, a fixed member beside the seat having a sliding engagement with the end of the arm to hold the seat from transverse movement.

In testimony whereof, I have signed my name to this specification.

WILLIAM H. EMOND.